US009065768B2

(12) United States Patent
Luo et al.

(10) Patent No.: US 9,065,768 B2
(45) Date of Patent: Jun. 23, 2015

(54) APPARATUS FOR A HIGH PERFORMANCE AND HIGHLY AVAILABLE MULTI-CONTROLLERS IN A SINGLE SDN/OPENFLOW NETWORK

(71) Applicant: Futurewei Technologies, Inc., Plano, TX (US)

(72) Inventors: Min Luo, Cumming, GA (US); Yingjun Tian, Shenzhen (CN); Quancai Li, Shenzhen (CN); Jiao Wang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 193 days.

(21) Appl. No.: 13/730,040

(22) Filed: Dec. 28, 2012

(65) Prior Publication Data

US 2014/0185450 A1    Jul. 3, 2014

(51) Int. Cl.
*H04L 12/851* (2013.01)
*H04L 12/721* (2013.01)
*H04L 12/801* (2013.01)

(52) U.S. Cl.
CPC ............... *H04L 45/44* (2013.01); *H04L 47/13* (2013.01); *H04L 47/35* (2013.01)

(58) Field of Classification Search
CPC .............................. H04L 17/35; H04L 47/13
USPC .......................................................... 370/236
See application file for complete search history.

(56) References Cited

U.S. PATENT DOCUMENTS

| 8,873,398 | B2 * | 10/2014 | Kempf et al. ................. 370/236 |
| 2009/0124263 | A1 * | 5/2009 | Wirtl ............................ 455/445 |
| 2009/0274128 | A1 * | 11/2009 | Zhang et al. .................. 370/338 |
| 2010/0091664 | A1 * | 4/2010 | Nandy et al. .................. 370/242 |

(Continued)

FOREIGN PATENT DOCUMENTS

| CN | 101072176 A | 11/2007 |
| CN | 102594697 A | 7/2012 |
| CN | 102640464 A | 8/2012 |

(Continued)

OTHER PUBLICATIONS

Shimonishi, Hideyuki, et al., "Architecture, Implementation, and Experiments of Programmable Network Using Openflow", IEICE Trans. Communication, vol. E94-B, No. 10, Oct. 2011.

(Continued)

*Primary Examiner* — Jay P Patel
(74) *Attorney, Agent, or Firm* — Conley Rose, P.C.; Grant Rodolph; Brandt D. Howell

(57) ABSTRACT

A method for distributing routing instructions to a plurality of nodes within an OpenFlow Software Defined Network (SDN) using a logically centralized multi-controller that comprises a plurality of controllers, wherein the method comprises receiving a plurality of incoming data packets, storing a plurality of current flow tables, queuing the incoming data packets, wherein the incoming data packets are queued based on the order received, processing the incoming data packets based on the order the incoming data packets were queued, wherein the incoming data packets that are first to be queued are the first to be processed, generating a plurality of flow tables by processing the incoming data packets, and transmitting the flow tables to the plurality of nodes when the flow tables have not been previously generated.

19 Claims, 11 Drawing Sheets

(56) References Cited

U.S. PATENT DOCUMENTS

2012/0250496 A1   10/2012   Kato
2014/0089506 A1*   3/2014   Puttaswamy Naga
                              et al. .............................. 709/225

FOREIGN PATENT DOCUMENTS

| CN | 102843300 A | 12/2012 | | |
|---|---|---|---|---|
| WO | WO 2007/066386 | * | 6/2007 | .............. H04L 12/56 |

OTHER PUBLICATIONS

Tootoonchian, Amin, et al., "HyperFlow: A Distributed Control Plan for OpenFlow", USENIX NSDI Internet Network Management Workshop/Workshop on Research on Enterprise networking (INM/WREN), San Jose, CA, Apr. 2010.

Cai, Zheng, "Maestro: Achieving Scalability and Coordination in Centralized network Control Plane", Ph.D. Thesis, Rice University, 2011.

Koponen, Teemu, et al., "Onix: A distributed control platform for large-scale production networks", In Operating Systems Design and Implementation (OSDI), Oct. 2010.

"OpenFlow Switch Specification", Version 1.0.0 (Wire Protocol 0x01), Dec. 31, 2009, https://www.opennetworking.org/about/onf-documents.

"OpenFlow Switch Specificaion", Version 1.1.0 Implemented (Wire Protocol 0x02), Feb. 28, 2011, https://www.opennetworking.org/about/onf-documents.

"OpenFlow 1.2". Dec. 2011, https://www.opennetworking.org/about/onf-documents.

McKeown, N., et al., "OpenFlow: Enabling Innovation in Campus Networks," ACM SIGCOMM Computer Communication Review, vol. 38, No. 2, Apr. 2008, pp. 69-74.

Foreign Communication From a Counterpart Application, PCT Application No. PCT/CN2013/090794, International Search Report dated Apr. 3, 2014, 6 pages.

Foreign Communication From a Counterpart Application, PCT Application No. PCT/CN2013/090794, Written Opinion dated Apr. 3, 2014, 3 pages.

* cited by examiner

APPARATUS FOR A HIGH PERFORMANCE AND HIGHLY AVAILABLE MULTI-CONTROLLERS IN A SINGLE SDN/OPENFLOW NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks comprise network nodes, such as routers, switches, bridges, and other devices that transport data through the network. Over the years, the telecommunication industry has made significant improvements to the network nodes to support an increasing number of protocols and specifications standardized by the Internet Engineering Task Force (IETF). Creating and coupling the complex network nodes to form networks that support and implement the various IETF standards (e.g. virtual private networks requirements) has inadvertently cause modern networks to become labyrinth-like and difficult to manage. As a result, vendors and third party operators struggled to continually customize, optimize, and improve the performance of the interwoven web of network nodes.

Software defined networking (SDN) is an emerging network technology that addresses customization and optimization concerns within the convoluted networks. SDN simplifies modern networks by decoupling the data forwarding capability (i.e. the data plane) from routing, resource, and other management functionality (i.e. the control plane) previously performed in the distributed network nodes. To streamline the control plane architecture, SDN implements a logically centralized system, which may include one or more centralized controllers, to manage the control plane. For example, software in multiple servers that are separate from the network switching nodes may manage a network's control plane functions, while the network switching nodes within the network are configured to govern the data plane. Currently, the OpenFlow protocol was created to support SDN in the industry, and provides communication between the data plane and the control plane. The OpenFlow protocol enables operators or other third parties to separate the control plane configurations and the data plane configurations for a variety of network switching nodes. Therefore, the adoption of the Open Flow protocol with SDN enables vendors and third parties to easily create new network management and control applications that optimize and increase network performance.

Although the combination of SDN and the OpenFlow enables network customization and optimization, the designation of a centralized system to manage all control plane functions inherently produces drawbacks for a network. For instance, an SDN/OpenFlow network is more susceptible to failures within the centralized systems which may cause computing and processing bottlenecks. Furthermore, a centralized system may lack the dynamic ability to easily adapt and manage varying traffic volume across different network locations. Network scalability also becomes a concern when costly upgrades are necessary for the centralize system to manage newly provisioned network nodes and end services (e.g. hosts).

To alleviate these concerns, one design option has been to use a distributed control system that utilizes a cluster of central controllers. The cluster of central controllers may function as a logically centralize system without being physically centralized. However, use of distributed control systems encounter load balancing and path rerouting issues caused by centralized controller failures (e.g. single-point-of-failures). Dedicated and inflexible control channels between every controller and all network nodes may be necessary to implement the control plane. Furthermore, as the number of centralized controllers increase, synchronization and other process delays between the centralized controllers and the network nodes may affect the managing capacity of the logically centralized system. Thus, new technology is necessary to address the problems of implementing SDN and OpenFlow in large intricate networks.

SUMMARY

In one example embodiment, the disclosure includes an apparatus for receiving a plurality of data packets and providing routing instructions to a plurality of nodes using the plurality of data packets comprising an active controller ring comprising at least one active controller, wherein the active controller ring is configured to receive a first data packet, receive a second data packet, process the first data packet with a first active controller while receiving the second data packet with a second active controller, compute a plurality of generated flow tables based on processing the first data packet and the second data packet, and transmit the plurality of generated flow tables via a plurality of outgoing packets, wherein the generated flow tables dictate the routing behavior of the nodes when the outgoing packets are received by the nodes.

In yet another example embodiment, the disclosure includes a logically centralized multi-controller for providing routing instructions to a plurality of nodes via a control plane, wherein the logically centralized multi-controller comprises a plurality of input ports, wherein each of the input ports are configured to receive an incoming frame, a plurality of output ports, wherein each of the output ports are configured to transmit an outgoing frame, a controller in-queue coupled to the plurality of input ports, wherein the controller in-queue is configured to temporarily store the incoming frames based on the order received, an active controller ring coupled to the controller in-queue, wherein the active controller ring comprises a plurality of active controllers, wherein the active controllers are configured to receive the incoming frames from the controller in-queue and process the incoming frames to produce a plurality of routing instructions, a dispatcher coupled to the active controller ring and to the plurality of output ports, wherein the dispatcher is configured to transmit the plurality of routing instructions received from the active controllers via the output ports, and a scheduler coupled to the active controller ring and to the controller in-queue, wherein the scheduler is configured to modify the number of active controllers within the active controller ring based on the number of incoming frames temporarily stored in the controller in-queue.

In yet another example embodiment, the disclosure includes a method for distributing routing instructions to a plurality of nodes within an OpenFlow Software Defined Network (SDN) using a logically centralized multi-controller that comprises a plurality of controllers, wherein the method comprises receiving a plurality of incoming data packets, storing a plurality of current flow tables, queuing the incoming data packets, wherein the incoming data packets are queued based on the order received, processing the incoming data packets based on the order the incoming data packets were queued, wherein the incoming data packets that are first to be queued are the first to be processed, generating a plurality of flow tables by processing the incoming data packets, transmitting the flow tables to the plurality of nodes when the flow tables have not been previously generated, modifying the number of controllers to process the incoming data packets, and reusing a set of active controllers to continually process the incoming data packets.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, apparatus, and system to implement a centralized multi-controller that manages the control plane of a network. The centralized multi-controller may employ an active controller ring where a scheduler component may dynamically modify the number of active controllers within the active controller ring. Additional active controllers may be added to the controller ring from a pool of available controllers. Each active controller within the active controller ring may be configured as a "master" state, a "slave" state, or as "equals." The centralized multi-controller may designate one active controller as the current "master" controller and the remaining active controllers within the active controller ring as "slave" controllers. The current "master" controller may listen to a controller-in-queue for an incoming data packet received from a network node. When the current "master" controller receives the incoming data packet, the current "master" controller may then switch to the "slave" state and proceeds to process the incoming data packet. Afterwards, a "slave" controller may switch to the "master" state and listen for a new data packet from the shared controller-in-queue. Active controllers that received an incoming data packet may process the data packet to generate flow tables that may be used to update the flow tables in one or more network nodes.

Figure 1:
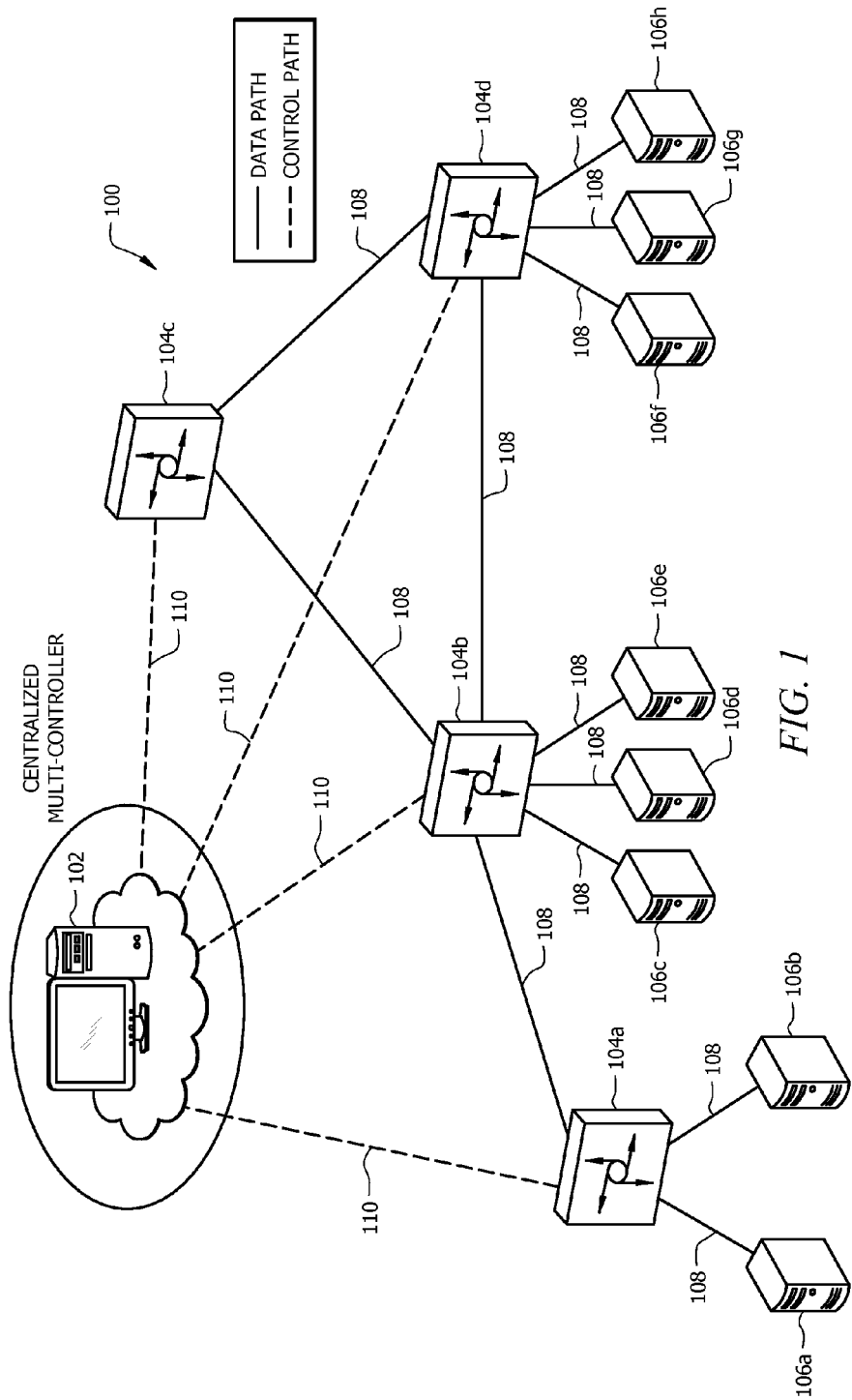
FIG. 1 is a schematic diagram of an embodiment of a network that comprises a centralized multi-controller to manage control plane functions.

FIG. 1 is a schematic diagram of an embodiment of a network 100 that comprises a centralized multi-controller 102 to manage control plane functions. Network 100 may be any network that transports data, such as Internet Protocol (IP) networks, Multiprotocol Label Switching (MPLS) networks, and Ethernet networks. Network 100 may be a network comprising network nodes (e.g. switches) that conform to OpenFlow protocols. Network 100 may be a network that operates in the electrical, optical, or a combination of both domains. Network 100 may offer data services that forward data from one node 106 to another node 106 without using pre-configured routes. Another embodiment of network 100 may forward data from one node 106 to another node 106 across the network along pre-configured or pre-established paths determined by the centralized controller.

The centralized multi-controller 102 may comprise a plurality of active controllers that are not shown in FIG. 1 and may be configured to oversee the routing and other management functions (e.g. the control plane) of network 100. The centralized multi-controller 102 may manage the control plane for a plurality of network nodes 104a-d via the control path 110. In one embodiment, the centralized multi-controller may be an SDN controller configured to use the OpenFlow protocol to access the forwarding plane of network nodes 104a-d. Persons of ordinary skill in the art are aware that the centralized multi-controller 102 may use other Open Application Programming Interface (API) services to access the forwarding plane of network nodes 104a-d.

The network nodes 104a-d may include switching devices (e.g. switches and routers) that are compliant with OpenFlow protocols as defined in Rev. 1.2 for the OpenFlow specification of the OpenFlow Organization, published December 2011, which is incorporated herein as if reproduced by its entirety. Network nodes 104a-d may also include switching devices that are compliant with previous revisions of the OpenFlow protocols (e.g. Rev. 1.0 and Rev. 1.1). Network nodes 104a-d may be coupled to each other via the data path 108, while network nodes 104a-d may be coupled to the centralized multi-controller 102 via the control path 110.

Both the data path 108 and the control path 110 may be direct links, such as fiber optic links, electrical links, and wireless links, or indirect links, such as logical connections or physical links with intervening nodes not shown in FIG. 1. Data path 108 may comprise a single link, a series of parallel links, a plurality of interconnected network nodes not shown in FIG. 1, or various combinations thereof to manage the forwarding plane within network 100. Control path 110 may be substantially similar to data path 108 except that the control path 110 may be used to manage the control plane. FIG. 1 also illustrates that network nodes 104a-d may be coupled to a plurality of end nodes 106a-h via the data paths 108. The end nodes 106a-h may include hosts, servers, storage devices or other types of end devices that may originate data into or receive data from network 100.

Figure 2A:
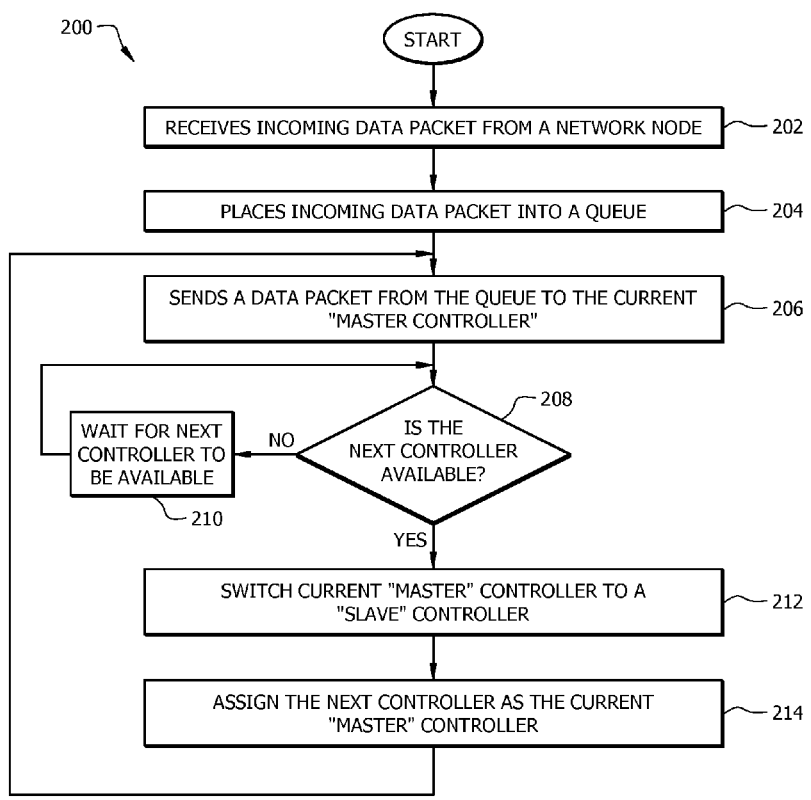
FIG. 2A is a flowchart of an embodiment of a method that manages the control plane using a centralized multi-controller.

FIG. 2A is a flowchart of an embodiment of a method 200 to manage the control plane using a centralized multi-controller. Method 200 may start at block 202 and may receive an incoming data packet from a network node. The network node may have received the data packet from an end node or another network node prior to method 200 receiving the incoming data packet. Moreover, at block 202 method 200 may receive more than one data packet from the same or different network node. For example, in FIG. 1, the centralized multi-controller 102 may have received different data packets from network nodes 104a and 104b. In another example, the centralized multi-controller 102 may receive data packets from network node 104a that originate from end nodes 106a and 106b. The data packets from end nodes 106a and 106b and network node 104b may require the centralized multi-controller 102 to calculate and produce different flow tables or routing instructions.

In one embodiment, method 200 may receive a data packet from a network node and/or an end node because of a new data flow. Using FIG. 1 as an example, network 100 may create a new data flow from end node 106a to end node 106f using network nodes 104a, b, and d. To obtain routing information for the new data flow, the centralized multi-controller 102 may receive the first data packet transmitted by end node 106a for the new flow via network node 104a. Alternatively, the centralized multi-controller 102 may receive data packets from network nodes 104 and/or end nodes 106 when other changes occur within the network, such as modifications to the network state, (e.g. node and link failures), network application, user priority, and/or quality of service (QoS).

Method 200 proceeds to block 204 after receiving the incoming data packet. At block 204, the incoming data packet may be placed into a controller in-queue to temporarily store the incoming data packets. Block 204 may then forward stored data packets out of the queue based on the order the controller in-queue received the incoming data packets. Using FIG. 1 as an example, the controller in-queue may receive a data packet from network node 104a prior to receiving a second data packet from network node 104b. Hence, one embodiment of block 204 may be a first-in-first-out (FIFO) queue that forwards the data packet from node 104a before forwarding the second data packet from node 104b. Once the data packet is pushed to the front or top of the controller in-queue stack, method 200 continues to block 206 and forwards the incoming data packet from the controller in-queue to the current "master" controller within an active controller ring. The current "master" controller may be the only active controller within the active controller ring to receive a data packet from the controller in-queue. The active controller ring and active controller configurations will be discussed in more detail in FIGS. 4A and 4B.

The method 200 may then proceed to block 208 to determine whether the next active controller in the active controller ring is available to receive another incoming data packet at block 208. If the next active controller is not available, the method 200 may proceed to block 210 to wait for the next active controller to become available. Method 200 may continue to wait and check whether the next active controller is available to receive a message by looping between block 208 and block 210. Once the next active controller in the active controller ring is available to receive a message, the method may proceed to block 212.

Block 212 may transition the current "master" controller to a "slave" controller after receiving a data packet from the controller in-queue. When the current "master" controller switches to a "slave" controller, the controller may no longer receive data packets from the in-controller queue. Subsequently, method 200 continues to block 214 and transitions the next active controller in the active controller ring from a "slave" controller to the current "master" controller. At this point, method 200 may then return back to block 206 and reprocess blocks 206, 208, 210, 212, and 214 using different active controllers. For example, after the next active controller switches from a "slave" controller to the current "master" controller, the active controller may now be ready to receive a data packet from the controller in-queue. After the second active controller receives a data packet, the active controller may transition back to a "slave" controller. A third active controller in the active controller ring may subsequently assume the current "master" controller. Method 200 may continue to loop through blocks 206, 208, 210, 212, and 214 in order to receive data packets from the controller in-queue.

Figure 2B:
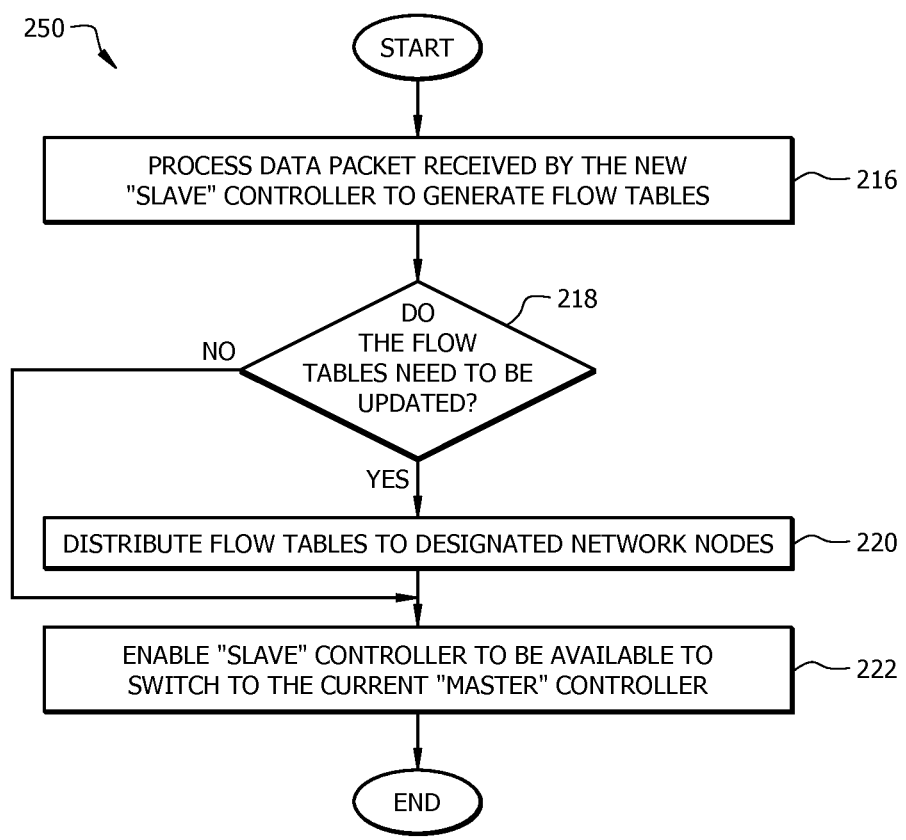
FIG. 2B is a flowchart of another embodiment of method used to manage the control plane using a centralized multi-controller.

FIG. 2B is a flowchart of another embodiment of method 250 used to manage the control plane using a centralized multi-controller. Method 250 may start at block 216 after an active controller receives a data packet from the controller in-queue and transitions to a "slave" controller as described in block 212. Method 250 may process the received data packet to generate data flow tables for network nodes within the data flow. In one embodiment, the network nodes within the data flow may include all network nodes within a network. The network nodes associated with a data flow may be determined by routing policies and/or flow table pipelines defined by the vendors of the network nodes. Method 250 may process block 216, while method 200 processes blocks 206, 208, 210, 212, and 214, as described in FIG. 2A, simultaneously. In other words, block 216 may be processed in parallel with blocks 206, 208, 210, 212, and 214. At block 216, method 250 may process the received data packet without checking or waiting for another active controller to finish processing a data packet. In other words, after receiving the data packet, method 250 may process the received data packet in parallel with other data packets.

From block 216, method 250 continues to block 218 to determine whether flow tables need to be updated for the network nodes. The flow tables generated in block 216 may be compared with the existing flow tables for the network nodes. For example, method 200 may avoid producing unnecessary traffic by first determining whether an existing flow table has already been generated using a prior received data packet. If the existing flow table includes the same values as the generated flow table in block 216 generated, then the flow tables do not need to be updated. In one embodiment, the flow tables may be multi-flow table that are associated with more than one data flow within a network. Using FIG. 1 as an example, network 100 may comprise a data flow from end node 106a to end node 106f and a second data flow from end node 106b to end node 106g. Block 218 may generate one multi-flow table that is associated with the two data flows. The flow tables may need to be updated when packets need to be rerouted, flow entries exceed a pre-specified time and become obsolete, and/or when other changes occur in the network environment.

If the flow tables do not need to be updated, method 250 may proceed to block 222. At block 222, method 250 may configure the "slave" controller to be ready to receive an additional data packet, and thus may be available to transition to the current "master" controller. The method 250 may end after block 222. Returning to block 218, if block 218 determines that the flow tables need to be updated, method 250 then moves to block 222 to distribute the flow tables to network nodes within the corresponding data flow. Afterwards, method 250 may subsequently end.

Figure 3:
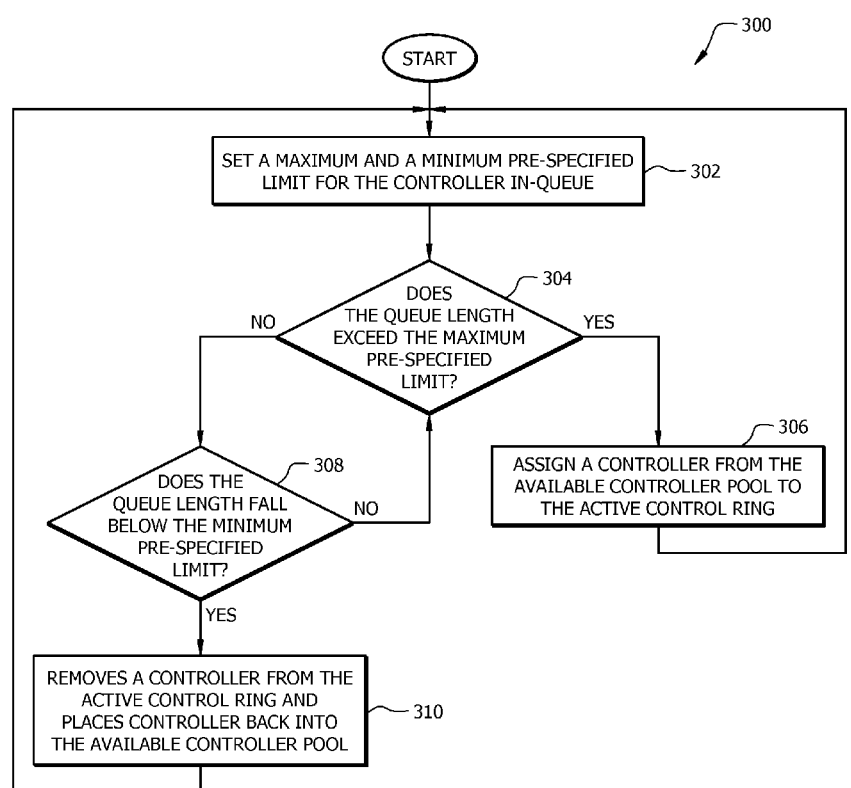
FIG. 3 is a flowchart of an embodiment of a method that manages the number of controllers receiving data from the queue.

FIG. 3 is a flowchart of an embodiment of a method 300 that manages the number of active controllers within an active controller ring using a scheduler. At block 302, method 300 may setup a maximum and a minimum pre-specified limit for the utilization of each active controller in the active ring, and/or the number of packets temporarily stored in the controller in-queue. The initial pre-specified limits may be configured based on the projected incoming data traffic, and the capacity and utilization of each active controller. The maximum pre-specified limits may indicate the utilization of each active controller in the active ring, and/or the maximum length of the controller in-queue before adding an active controller to the active controller ring. The minimum pre-specified limits may indicate the minimum length of the controller in-queue before removing an active controller from the active controller ring. For example, each active controller may be configured to handle about 200 data packets per second. Block 302 may initially allocate five active controllers to the active controller ring to handle an incoming data packet rate of about 1,000 data packets per second. Thus, the maximum pre-specified limit may be set to about 1,000 data packets within the data queue, while the minimum pre-specified limit may be set to about 800 data packets. In one embodiment, the maximum and minimum pre-specified limits may be based on the average rate of incoming data packets or the average length of the controller in-queue for a given time interval. Persons of ordinary skill in the art are aware that other controller in-queue lengths may be set for block 302.

Once the maximum and minimum pre-specified limits are set, method 300 may then proceed to block 304 to determine whether the controller in-queue length exceeds the maximum specified limit. If the controller in-queue length exceeds the maximum pre-specified limit, the method 300 moves to block 306. At block 306, one or more controllers from the available controller pool may be assigned to the active controller ring. After adding one or more controllers to the active control ring, method 300 may loop back to block 302 to set a new maximum and minimum pre-specified limits. Continuing with the prior example, the maximum pre-specified limit may be about 1,000 data packets within the controller in-queue. When the length of the controller in-queue reaches above 1,000 data packets (e.g. about 1,300 data packets), one or more available controllers (e.g. two available controllers) may be added to the active controller ring to process the data packets. The available controllers may be added one at a time to the active controller ring with a short delay between the additions of each available controller. Afterwards, a new maximum (e.g. about 1,400 data packets) and minimum (e.g. about 1,200 data packets) pre-specified limits may be set based on seven active controllers within the active controller ring. Method 300 may also be applied when the utilization of current active controllers are used to increase or decrease the number of active controllers when incoming traffic flow fluctuates.

Returning back to block 304, if the controller in-queue length does not exceed the maximum pre-specified limit, then method 300 moves to block 308. At block 308, method 300 determines whether the controller in-queue length falls below the minimum pre-specified limit. When the controller in-queue length does not fall below the minimum pre-specified limit, then method 300 proceeds to block 304 to continue checking that the controller in-queue does not exceed the maximum pre-specified limit. However, if the pre-specified queue length is less than the minimum pre-specified limit, method 300 then proceeds to block 310. At block 310, one or more controllers may be removed from the active control ring and placed back into the pool for available controllers. Using the same example as discussed for block 302, the minimum pre-specified limit may be about 800 data packets within the controller in-queue. When the length of the controller in-queue is less than 800 data packets (e.g. about 500 data packets), one or more active controller (e.g. two active controller) may be removed from the active controller ring and allocated to the pool of available controllers. Similar to block 306, block 310 may then loop back to block 302 to set a new maximum (e.g. about 600 data packets) and minimum (e.g. about 400 data packets) pre-specified limits for three active controllers. Method 300 may also be applied when the utilization of current active controllers are used to increase or decrease the number of active controllers when the incoming traffic flow fluctuates.

Figure 4A:
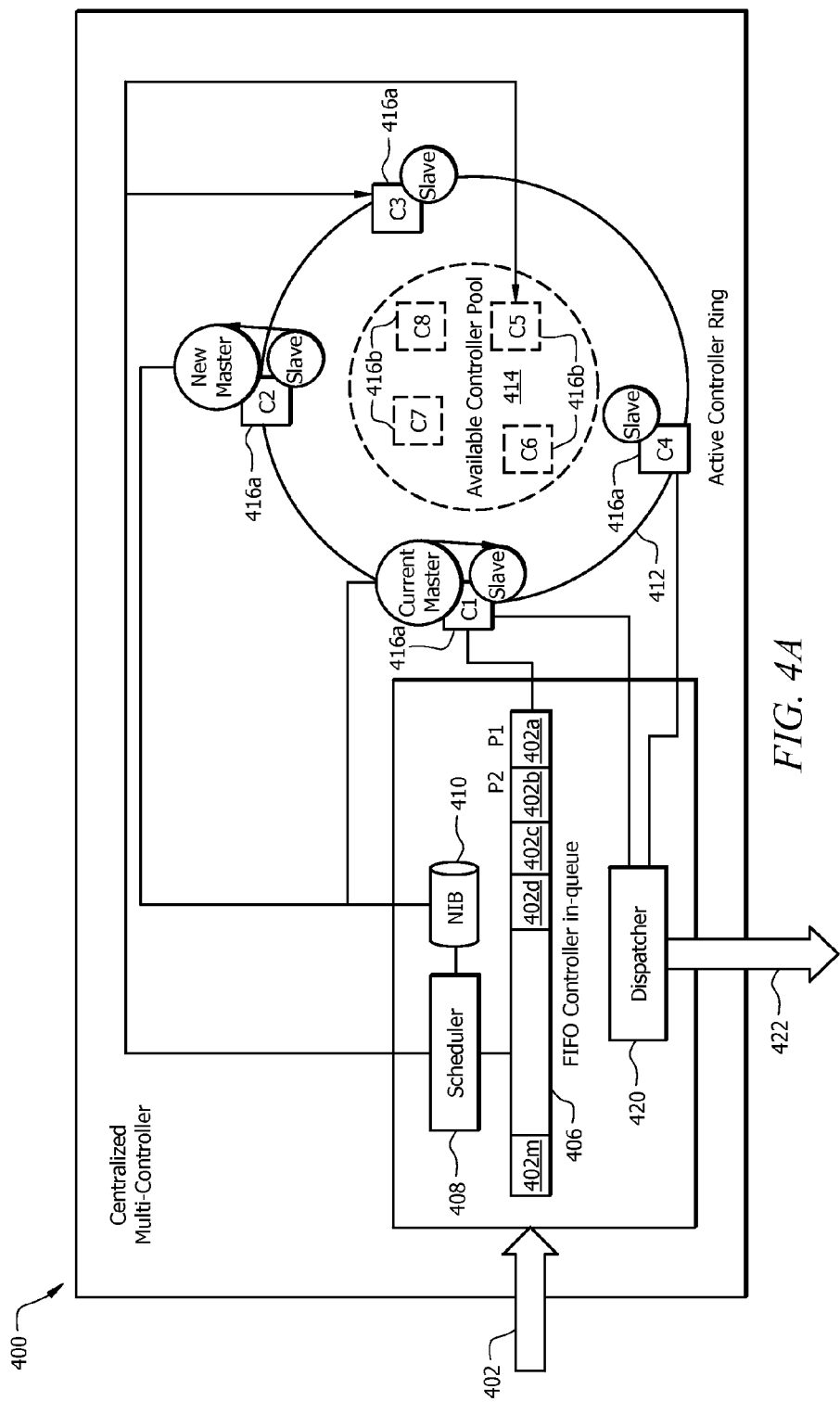
FIG. 4A is a schematic diagram of an embodiment of a centralized multi-controller that manages control plane functions for a network.

FIG. 4A is a schematic diagram of an embodiment of a centralized multi-controller 400 that manages the control plane functions for a network. The centralized multi-controller 400 may comprise a Controller In-queue component 406, a Scheduler component 408, a Network Information Base (NIB) component 410, an Active Controller Ring component 412, a Pool of Available Controllers component 414, and a Dispatcher component 420. The centralized multi-controller 400 may also comprises a plurality of input ports and output ports that receive incoming data packets 402 and transmit outgoing data packets 422 to network nodes within the network. In one embodiment, the input and output ports for the multi-controller 400 may be associated with a plurality of different virtual service instances.

The centralized multi-controller 400 may receive one or more incoming data packets 402 on one or more input ports. The incoming data packets 402 may comprise header information that may be used by the active controllers 416a to generate flow tables that produce routing information for network nodes within a network. In one embodiment, the incoming data packet 402 may be any Open Systems Interconnection (OSI) layer 2 or layer 3 encoded data packet, such as an Ethernet frame or an IP packet. The header information may be encoded using a variety of protocols, such as MPLS, Asynchronous Transfer Mode (ATM), Ethernet, Internet Protocol version 4 (IPv4), Internet Protocol version 6 (IPv6), etc. The header information may include a destination address encoded in an Ethernet frame, multi-protocol label switching (MPLS), IP packet, or other similar types of data signals. Another embodiment of the header information may include a label used in various protocols, such as a MPLS or data link connection identifier label (DLCI) in frame relay protocols.

After receiving the incoming data packets 402, the centralized multi-controller 400 may place the incoming data packets into a Controller In-queue component 406. The Controller In-queue component 406 may temporarily store the incoming data packets 402 that may eventually be forwarded to the Active Controller Ring component 412. The Controller In-queue component 406 may be shared amongst the active controllers 416a within the Active Controller Ring component 412. The incoming data packets 402 may be stored in the Controller In-queue component 406 based on the order the multi-controller 400 receives the incoming data packets 402. In one embodiment, the Controller In-queue component 406 may be a FIFO queue. As a FIFO queue, the incoming data packets 402 received first by the centralized multi-controller 402 may be placed first in the Controller In-queue component 406. Hence, the incoming data packets 402 received first are forwarded to the Active Controller Ring component 412 prior to any other incoming data packets 402 received afterwards. For example, in FIG. 4, the Controller In-queue component 406 temporarily holds incoming data packets 402a-m. Incoming data packet 402a is at the front or top of the stack of the controller in-queue, while incoming data packet 402b is queued behind the incoming data packet 402a. The last incoming data packet stored in the Controller In-queue component 406 is incoming data packet 402m. In this instance, the centralized multi-controller 400 may have received incoming data packet 402a prior to receiving incoming data packet 402b, while incoming data packet 402m may be the last received data packet. Additionally, because the incoming data packet 402a is at the front of the queue stack, incoming data packet 402a may be the next incoming data packet 402 to be forwarded to the Active Controller Ring component 412.

The NIB component 410 may be coupled to the Scheduler component 408 and to a plurality of active controllers 416a within the Active Controller Ring component 412. NIB may maintain and provide necessary supporting information for resource utilization and traffic control. For instance, the NIB component 410 may provide multiple methods for the control logic to gain access to network nodes, index all the of network nodes based on network node identifiers, track state information of network nodes, and network nodes features and capabilities. The NIB component 410 may also provide routing information using flow tables, such as NIB tables, which may be analogous to routing information bases (RIBs) or forwarding information bases (FIBs). The NIB tables may store a graph of the network nodes within a network topology instead of storing prefixes to destinations found in RIBs or FIBs. Moreover, the NIB component 410 may support logical elements (e.g. overlay tunnels) within a network. The NIB may also designate which flow entries or tables correspond to which network nodes. The active controllers 416a within the Active Controller Ring component 412 may use the routing information (e.g. flow tables) provided by the NIB component 410 and header information from the incoming data packets 402 to generate and compare flow tables.

The Active Controller Ring component 412 may comprise a plurality of active controllers 416a that may be used to process the incoming data packet 402. The active controllers 416a may be logically coupled together to form a circular or a ring shaped Active Controller Ring component 412. The active controllers 416a may comprise one or more central processor unit (CPU) chips, network processor, or other general-purpose processors. The active controllers 416a may be configured to implement several different logic states such as, the "master" state, the "slave" state, or an "equals" state. The shape of the Active Controller Ring component 412 and continuous circulation of a token may alternate which active controllers 416a enter the "master" state. FIG. 4A illustrates that one active controller C1 416a may be in the "master" state while the remaining active controllers C2-C4 416a within the Active Controller Ring component 412 may be in the "slave" state. While in the "master" state, the active controller C1 416a may be tasked with listening and waiting to receive an incoming data packet 402 from the Controller In-queue component 406. Active controllers C2 416a may be in the "slave" state and may be tasked with processing the incoming data packet 402 to generate flow tables, or waiting to transition to the "master" state. A token or some other special data packet may be passed from active controller C1 416a in the "master" state to the next in-line active controller C2 416a in the Active Controller Ring component 412. The token may be passed when the active controller C1 416a is ready or about to receive an incoming data packet 402. When the next in-line active controller C2 416a receives the token, the next in-line active controller C2 416a may transition from the "slave" state to the "master" state. The token used amongst the active controllers 416a may be maintained centrally within the centralized multi-controller 400. The "equal" state may represent when none of the active controllers 416a are configured as the "master" state and/or the "slave" state, and every controller has full access to the network nodes and is equal to other controllers in the same role.

Figure 4B:
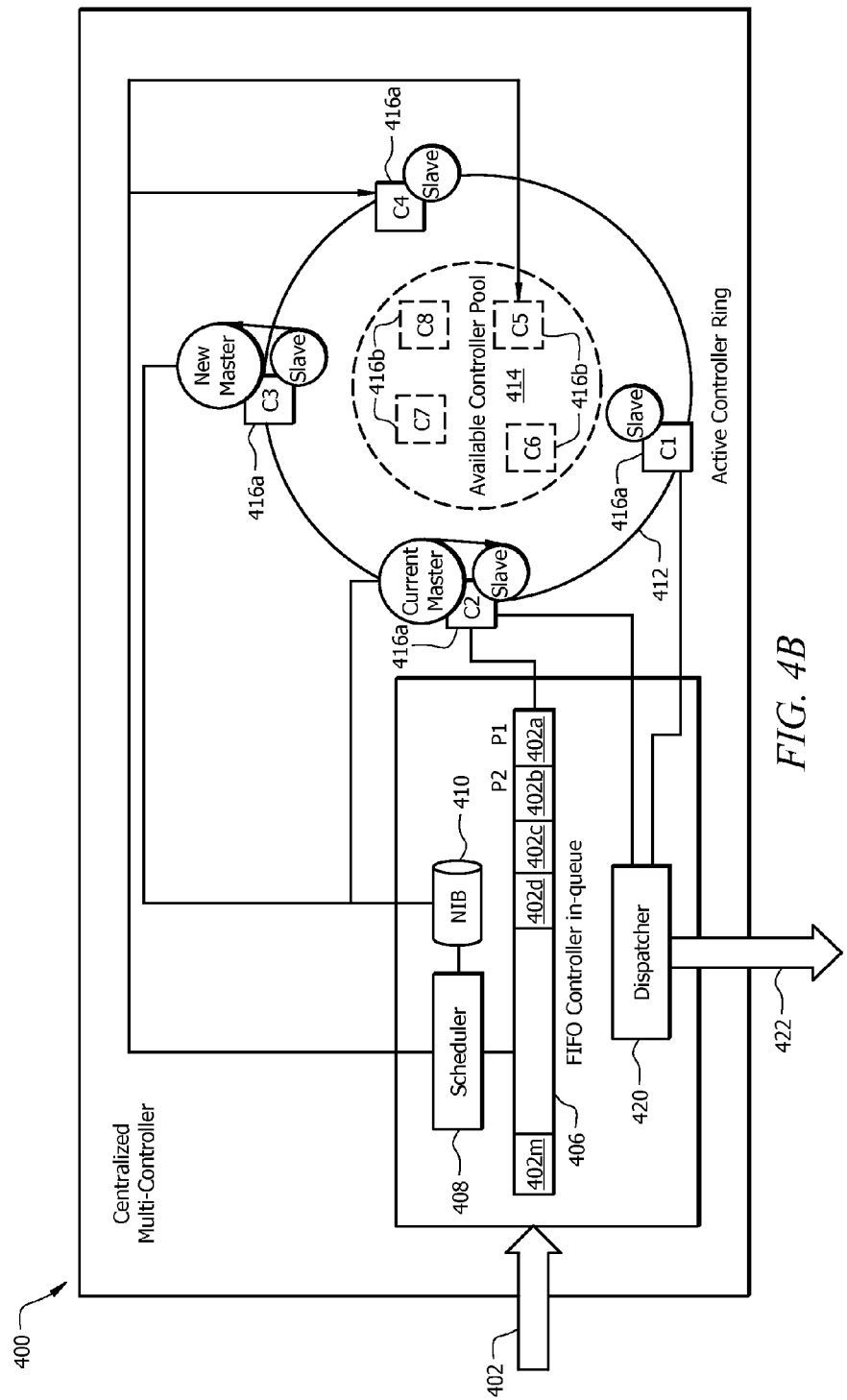
FIG. 4B is a schematic diagram of another embodiment of a centralized multi-controller that manages control plane functions for a network.

FIG. 4B is a schematic diagram of another embodiment of a centralized multi-controller 400 where active controller C2 416a is the current "master" controller. Active controller C1 416a may be in the "slave" state and may process the incoming data packet 402 received in FIG. 4A. Meanwhile, the active controller C2 416a may be in the "master" state and listening for an additional incoming data packet 402. The processing of the incoming data packet 402 by active controller C1 416a and listening for an additional incoming data packet 402 by active controller C2 416a may be implemented in parallel. Once the active controller C2 416a receives an incoming data packet 402, the active controller C2 416a may start to transition back to the "slave" state and transfer control to the next-in line active controller C3 416a. FIG. 4B illustrates that the active controller C3 416a may transition to the new "master" controller after active controller C2 416a receives the incoming data packet.

The state transitioning process as shown in FIGS. 4A and 4B may repeat itself for different active controllers 416a (e.g. active controller C4 416a) until all active controllers 416a have received an incoming data packet 402 from the Controller In-queue component 406. When this occurs, all the active controllers 416a may become temporarily unavailable to receive additional incoming data packets 402 from the Controller In-queue component 406. Referring back to block 306 in FIG. 3, an available controller 416b may be added if the Controller in-queue component's 406 length exceeds a maximum pre-specified limit or the utilization of all current active controllers exceed a pre-specified limit, while the active controllers 416a are processing the incoming data packets 402.

After receiving an incoming data packet 402, an active controller 416a may process the incoming data packet 402 by computing flow tables. Multi-flow tables may be generated as described in the U.S. Provisional Patent Application No. 61/731,389 filed Nov. 29, 2012 and entitled "A Mechanism for Multiflow Table Design and Implementation under SDN OpenFlow" which is incorporated herein by reference as if reproduced in its entirety. The flow entries in each flow table may use the header information and routing protocols. The active controller 416a may also learn, through feature inquiry and the structure of the flow table pipelines with attributes associated with each flow table as pre-defined by vendors of the network nodes. The active controllers 416a may be configured to process the different incoming data packets 402 in a parallel fashion. In other words, an active controller 416a may not wait for other active controllers 416a to finish processing incoming data packets before processing its own incoming data packet 402. Using FIGS. 4A and 4B as an example, the current "master" active controller C1 416*a* may transfer the token to the new "master" active controller C2, receive an incoming data packet 402*a*, and process the incoming data packet 402*a*. Afterwards, the "master" active controller C2 416*a* may subsequently receive an incoming data packet 402*b* and may process the received incoming data packet 402*b*. As a result, processing the two incoming data packets 402*a* and *b* may be implemented in parallel using two different active controllers 416*a*.

Figure 4C:
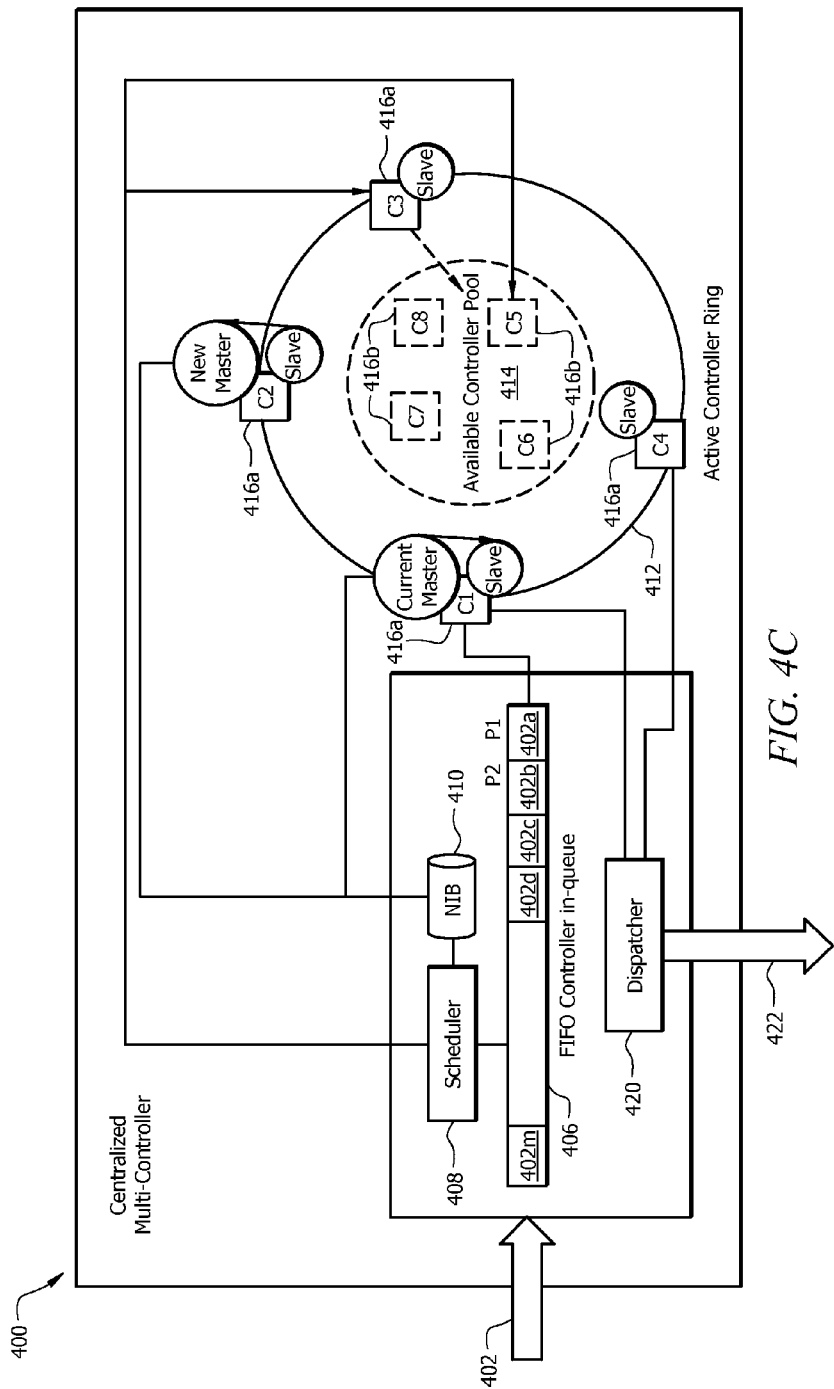
FIG. 4C is a schematic diagram of another embodiment of a centralized multi-controller where the Scheduler removes an active controller from the active controller ring.

FIG. 4C is a schematic diagram of another embodiment of a centralized multi-controller 400 where the Scheduler component 408 removes an active controller 416*a* from the Active Controller Ring component 412. The Scheduler component 408 may be coupled to the NIB component 410, the Controller In-queue component 406, a plurality of active controllers 416*a* within the Active Controller Ring component 412, and a plurality of available controllers 416*b* within the Pool of Available Controllers component 414. The Scheduler component 408 may be any computational logic device (e.g. general-purpose processor) capable of monitoring the Controller In-queue component 406 and dynamically removing active controllers 416*a* and assigning available controllers 416*b* to the Active Controller Ring component 412. The Scheduler component 408 may be configured with pre-specified maximum and minimum lengths for the Controller In-queue component 406 or the utilization of active controllers that are used to determine when to add or remove controllers 416*a* and 416*b*. Recall that the pre-specified minimum length value may be the minimum number of incoming data packets 402 before one or more active controllers 416*a* may be dynamically removed from the active controller ring and placed in the Pool of Available Controllers component 414. FIG. 4C illustrates the active controller C3 416*a* may be removed from the Active Controller Ring component 412 and placed into the Pool of Available Controllers component 414 when the queue falls below the minimum pre-specified length.

Figure 4D:
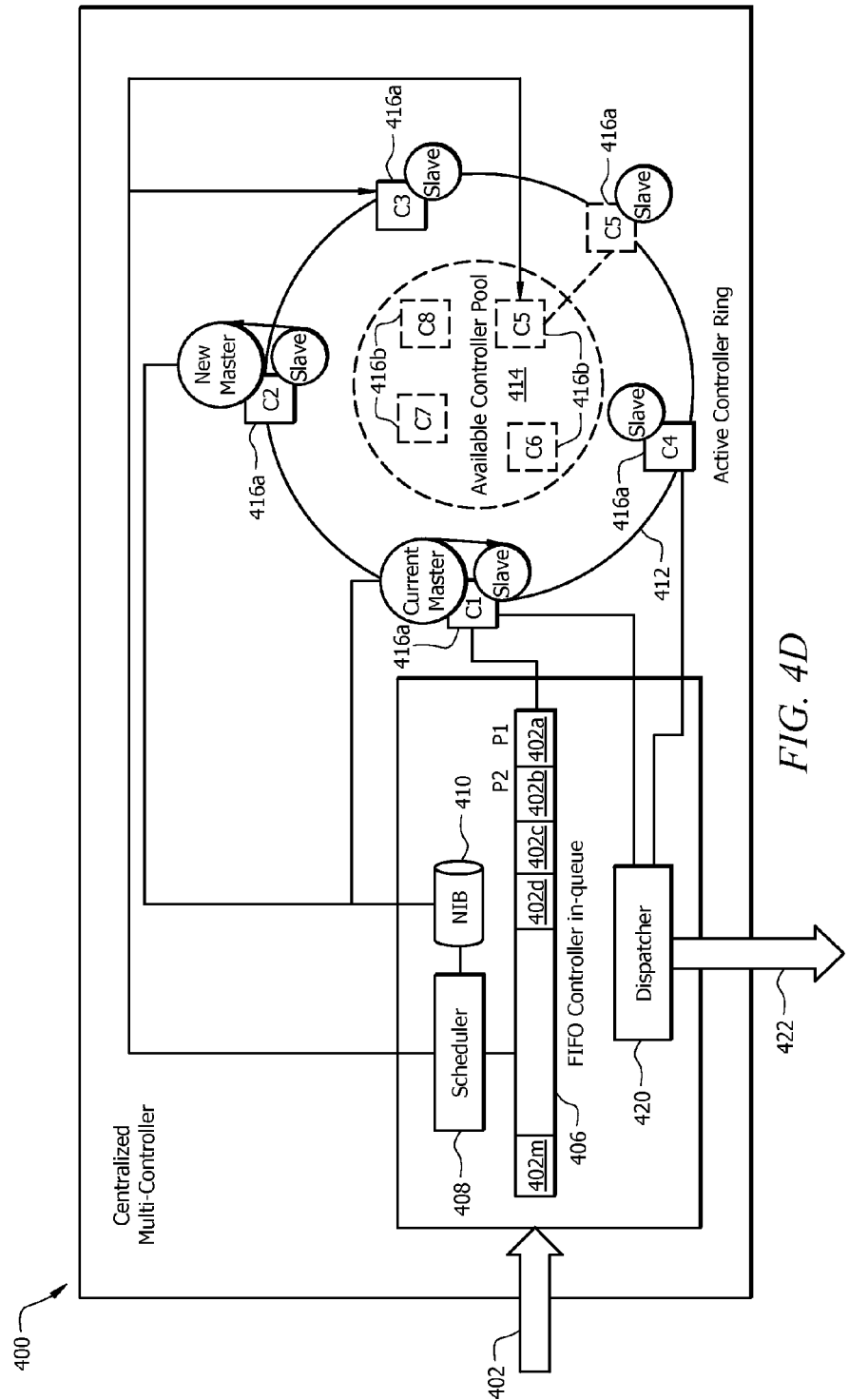
FIG. 4D is a schematic diagram of another embodiment of a centralized multi-controller where the Scheduler assigns an available controller to the active controller ring.

FIG. 4D is a schematic diagram of another embodiment of a centralized multi-controller 400 where the Scheduler component 408 assigns an available controller 416*b* to the Active Controller Ring component 412. As discussed previously in FIG. 3, the Scheduler component 408 may have a pre-specified maximum length value that indicates the maximum number of incoming data packets 402 the Controller In-queue component 406 may temporarily store before adding one or more available controller 416*b* to the Active Controller Ring component 412. When the queue length exceeds the maximum length value, then one or more available controllers 416*b* may be assigned to the Active Controller Ring component 412. The available controllers 416*b* may be pre-initialed with unique references or pointers that may be assigned to the active controller ring data structures. FIG. 4D illustrates the Scheduler component 408 may assign available controller C5 416*b* to the Active Controller Ring component 412, while other available controllers C6-C8 416*b* remain in the Pool of Available Controllers component 414.

Figure 4E:
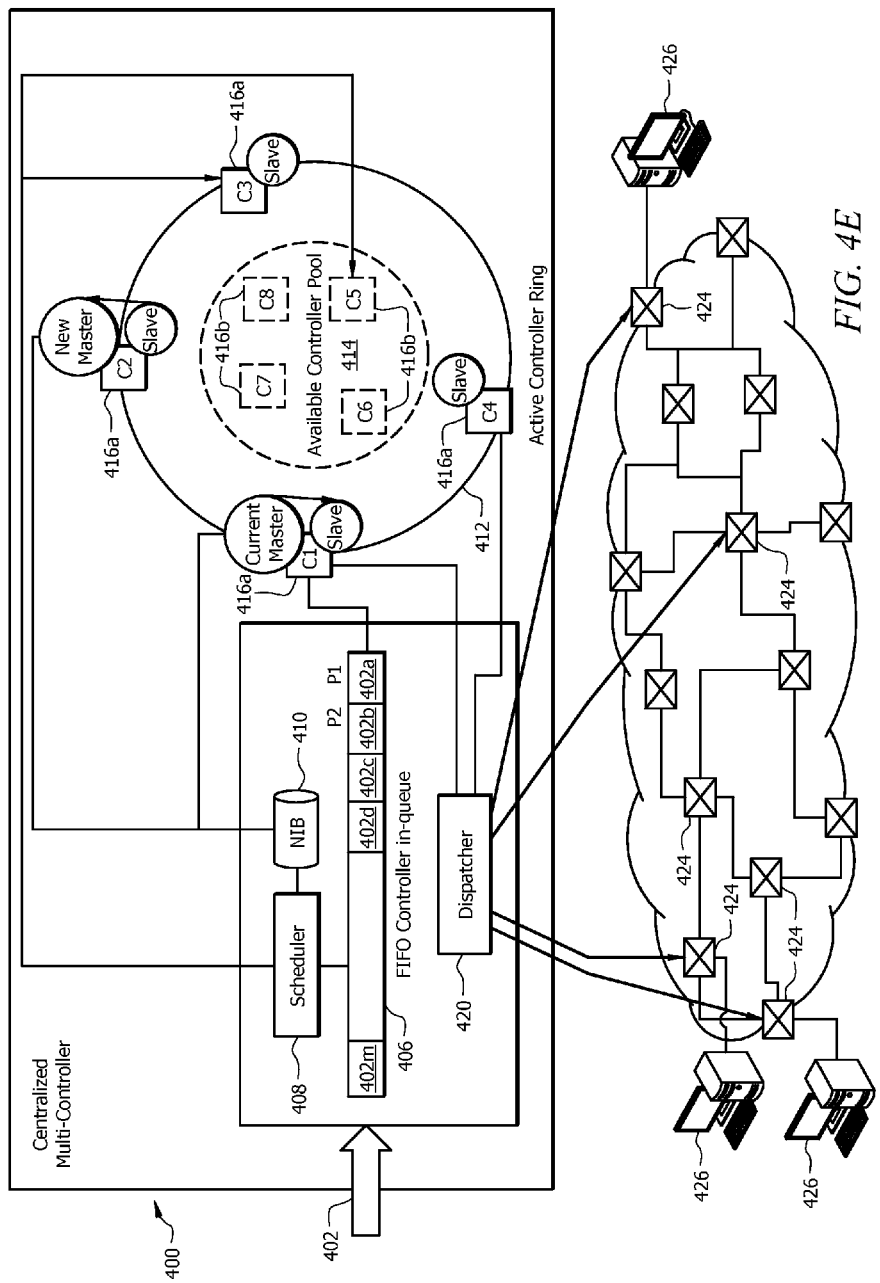
FIG. 4E is a schematic diagram of an embodiment of a centralized multi-controller that distributes flow tables to network nodes using a dispatcher.

FIG. 4E is a schematic diagram of an embodiment of a centralized multi-controller 400 that distributes flow tables to network nodes 424 using a Dispatcher component 420. Recall that the active controllers 416*a* may generate flow tables in a parallel fashion. An active controller 416*a* may determine whether the same and/or similar flow has already been processed by the active controller 416*a* and/or other active controllers 416*a*. For example, active controller C1 416*a* may receive and process an incoming packet 402 from the Controller In-queue component 406 to generate a flow table. Active controller C1 416*a* may subsequently determine whether the active controller C1 416*a* and/or other active controllers C2-C4 416*a* within the Active Controller Ring component 412 have already processed the same and/or similar flow. The active controller C1 416*a* may use key attributes from information available to the active controller C1 416*a* to determine whether the same and/or similar flow has already been processed. Updating the flow table with additional flow table entries and/or flow table entries with different values may originate because of network state changes, obsolete flow table entries, and modification of network applications, user priority, and/or QoS requirements. The active controller 416*a* may forward the flow table entries, flow table modification instructions, and/or flow tables to the Dispatcher component 420.

The Dispatcher component 420 may be coupled to a plurality of output ports and a plurality of active controllers 416*a* within the active controller ring. The Dispatcher component 420 may be configured to transmit a plurality of outgoing data packets 422 that comprise the flow tables generated by an active controller 416*a*. The Dispatcher component 420 may disseminate flow tables or flow entry modifications generated by the active controller 416*a* to network nodes 424 associated with a given data flow. The Dispatcher component 420 may use a flow table or multi-flow table pipeline to regulate when the flow tables may be distributed to network nodes 424. As discussed before, the flow tables may be associated with more than one data flow within a network. In one embodiment, the Dispatcher component 420 may use the OpenFlow protocol to distribute the flow tables to the network nodes 424. After receiving the flow tables, the network nodes 424 may then use the new flow tables to forward data packets within the network to end nodes 426.

Figure 5:
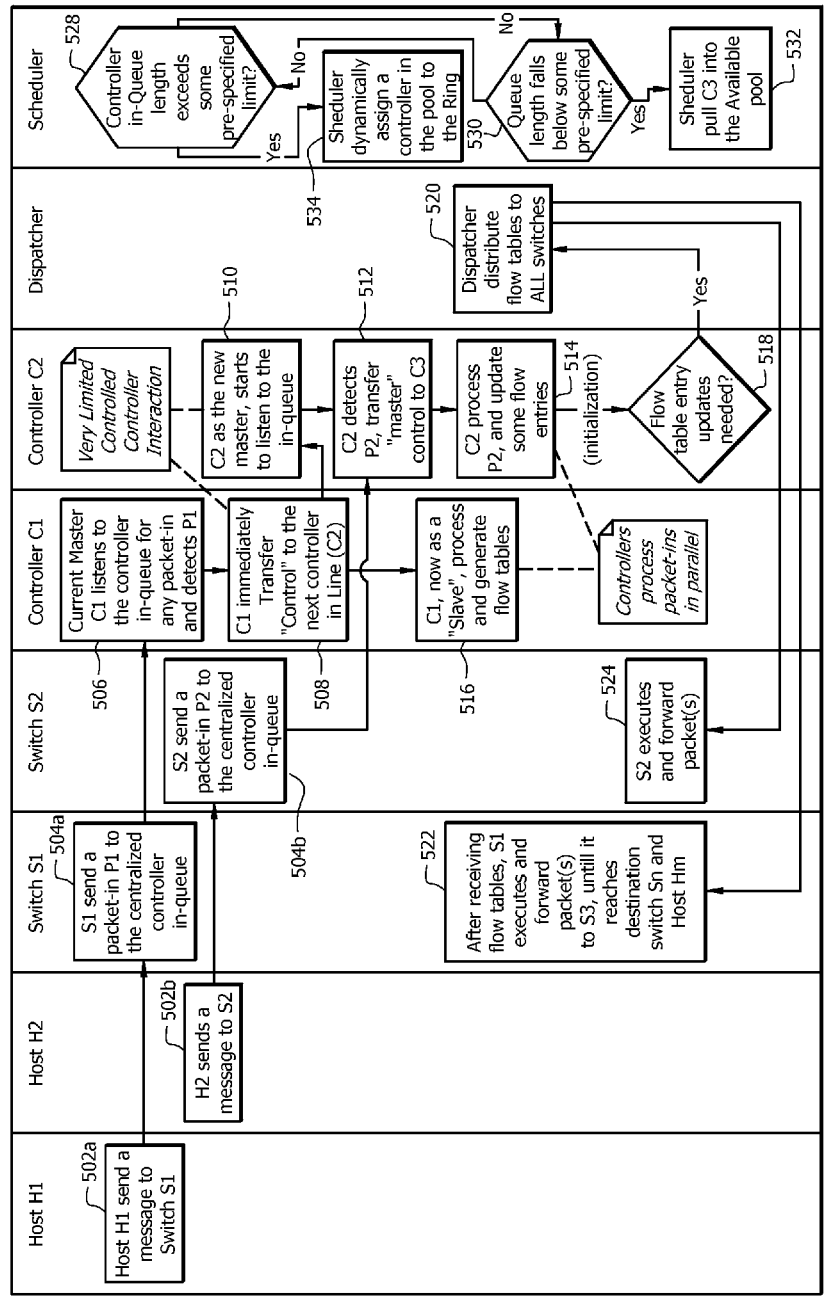
FIG. 5 is a protocol diagram of an embodiment of a message exchange process for managing control plane functions for a network using a centralized multi-controller.

FIG. 5 is a protocol diagram of an embodiment of a message exchange process 500 for managing control plane functions for a network using a centralized multi-controller. FIG. 5 illustrates that a Host H1 may send a message 502*a* to Switch S1, while another Host H2 may send a message 502*b* to Switch S2. Switch S1 and Switch S2 may subsequently forward the message 504*a* and 504*b*, respectively, to a centralized controller in-queue. The centralized controller in-queue may receive message 504*a* before receiving message 504*b*. As a result, message 504*a* may be forwarded to Controller C1, while message 504*b* may be forwarded to Controller C2. Designating the master control between Controllers C1 and C2 illustrated in process blocks 506, 508, 510, 512 may be substantially similar to the designation process for blocks 206-214 of method 200 shown in FIG. 2A. The processing and generating flow tables using messages 504*a* and 504*b* at process blocks 514, 516, 518, and 520 may be substantially similar to method 200 as described in blocks 216, 218, and 220 shown in FIG. 2B. As shown in FIG. 5, Controller C1 may process message 504*a* in parallel with message 504*b* at 514 and 516. After the Dispatcher distributes the flow tables to all the switches, Switches S1 and S2 may utilize the flow tables and forward the data packets to the destination hosts as described in process blocks 522 and 524. FIG. 5 also illustrates that a Scheduler may monitor the length of the controller in-queue using 528, 530, 532, and 534, which are substantially similar to method 300 as described in blocks 302, 304, 306, 308, and 310.

Figure 6:
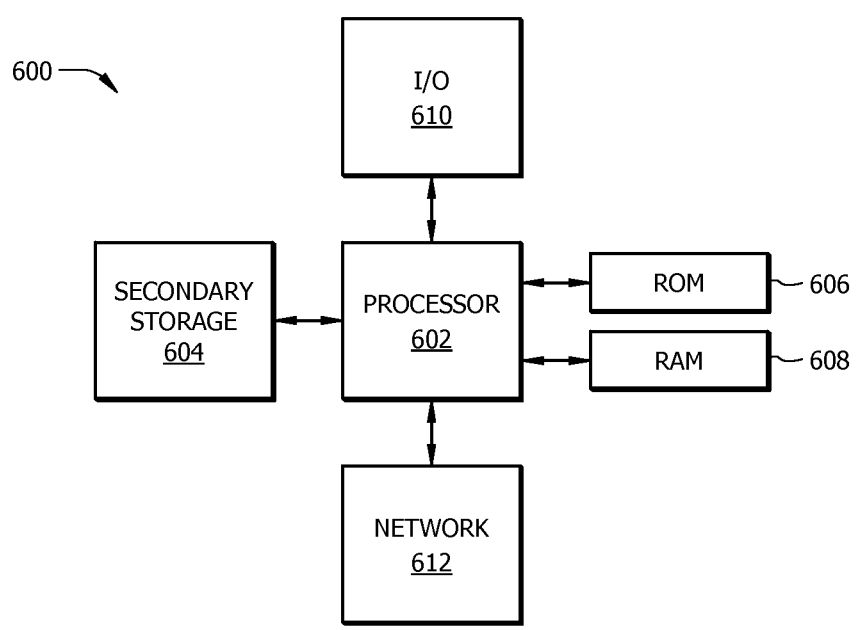
FIG. 6 is a schematic diagram of one embodiment of a general-purpose computer system suitable for implementing the several embodiments of the disclosure.

FIG. 6 illustrates a typical, general-purpose network component 600 that may correspond to or may be part of the nodes described herein, such as a server, a switch, a router, or any other network nodes. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The general-purpose network component 600 may also comprise at the processor 602 and/or any of the other components of the general-purpose network component 600.

The processor 602 may be implemented as one or more general-purpose CPU chips, or may be part of one or more application specific integrated circuits (ASICs) and/or digital signal processors (DSPs). The processor 602 may comprise a central processor unit or CPU. The processor 602 may be implemented as one or more CPU chips. The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network controller for providing routing instructions to a plurality of nodes in a Software Defined Network (SDN), comprising:
   a plurality of input/output (I/O) ports configured to:
      couple to a centralized controller of the SDN; and
      couple to a plurality of active controllers, wherein the network controller and the active controllers form an active controller ring in the SDN; and
   a processor coupled to the I/O ports and configured to:
      receive, via the I/O ports, a first message that dynamically transfers a master controller role from a first of the active controllers to the network controller for flow table generation;
      receive, via the I/O ports, a data packet from the centralized controller when the network controller comprises the transferred master controller role, wherein the data packet is destined to a first of the nodes in the SDN;
      generate a flow table for forwarding the data packet through the SDN towards the first node; and
      transmit, via the I/O ports, the generated flow table to the centralized controller, wherein the generated flow table dictates a routing behavior of the nodes.

2. The network controller of claim 1, wherein the processor is further configured to transmit a second message to a second of the active controllers after receiving the data packet, wherein the second message indicates a transfer of the master controller role to the second active controller.

3. The network controller of claim 2, wherein the network controller and the plurality of active controllers are logically coupled in a circular loop to form the active controller ring, and wherein the first active controller and the second active controller are adjacent to the network controller in the circular loop.

4. The network controller of claim 1, wherein the processor is further configured to receive a second message from the centralized controller instructing the network controller to be removed from the active controller ring when a utilization of the network controller falls below a certain first pre-specified limit.

5. The network controller of claim 4, wherein the processor is further configured to receive a third message from the centralized controller instructing the network controller to be added to the active controller ring when a utilization of the active controllers exceeds a certain second pre-specified limit.

6. The network controller of claim 1, wherein the SDN is an OpenFlow SDN.

7. A centralized network controller for providing routing instructions to a plurality of nodes in a network via a control plane, wherein the centralized network controller comprises:
a plurality of hardware ports configured to:
receive a plurality of incoming frames from the plurality of nodes; and
couple to an active controller ring comprising a plurality of active controllers;
a memory coupled to the plurality of hardware ports and configured to store a controller in-queue, wherein the controller in-queue is configured to temporarily store the incoming frames based on the order received; and
a processor coupled to the hardware ports and the memory, wherein the processor is configured to:
transmit the plurality of the incoming frames from the controller in-queue to the plurality of active controllers via the hardware ports;
receive a plurality of routing instructions for the incoming frames from the active controllers via the hardware ports;
transmit the plurality of routing instructions received from the active controllers to the plurality of nodes via the hardware ports, wherein the routing instructions are retransmitted to the plurality of nodes to transform routing behaviors of the nodes; and
modify a number of active controllers within the active controller ring based on a number of incoming frames temporarily stored in the controller in-queue.

8. The centralized network controller of claim 7, wherein the hardware ports are further configured to couple to an available controller pool comprising at least one available controller, and wherein the processor is further configured to dynamically assign a first available controller from the available controller pool to the active controller ring as an additional active controller when the number of incoming frames temporarily stored in the controller in-queue exceeds a maximum threshold.

9. The centralized network controller of claim 7, wherein the processor is further configured to dynamically remove one of the active controllers from the active controller ring when the number of incoming frames temporarily stored in the controller in-queue is less than a minimum threshold.

10. The centralized network controller of claim 9, wherein the hardware ports are further configured to couple to an available controller pool, wherein removing the first active controller from the active controller ring causes the first active controller to become an available controller in the available controller pool, and wherein the processor is further configured to dynamically reassign the first active controller to the active controller ring after removing the first active controller from the active controller ring.

11. The centralized network controller of claim 7, wherein the plurality of active controllers are logically coupled in a circular loop to form the active controller ring, and wherein the processor is further configured to transmit the incoming frames from the controller in-queue in a first-in-first-out (FIFO) order to alternating active controllers in an order of the circular loop.

12. The centralized network controller of claim 7, wherein the processor is further configured to:
dynamically assign one of the active controllers in the active controller ring as a master active controller; and
dynamically assign remaining active controllers in the active controller ring as slave active controllers,
wherein a first of the incoming frames is transmitted to the active controller that is assigned as the master active controller, and
wherein a first of the routing instructions is for forwarding the first incoming frame in the network, and
wherein the first routing instruction is received from the active controller that is assigned as the master active controller.

13. The centralized network controller of claim 7, wherein a first of the incoming frames and a second of the incoming frames are received from a common node, wherein the first incoming frame is transmitted to a first of the active controllers, wherein the second incoming frame is transmitted to a second of the active controllers, and wherein the first active controller is adjacent to the second active controller in the active controller ring.

14. The centralized network controller of claim 7, wherein the hardware ports are further configured to couple to an available controller pool comprising at least one available controller, and wherein the processor is further configured to:
measure utilization of the active controllers in the active controller ring; and
dynamically assign an available controller from the available controller pool to the active controller ring as an additional active controller when the measured utilization of the active controller exceeds a certain pre-specified limit.

15. The centralized network controller of claim 7, wherein the processor is further configured to:
measure utilization of the active controllers in the active controller ring; and
dynamically remove one of the active controllers from the active controller ring when the measured utilization of the active controllers falls below a certain pre-specified limit.

16. The centralized network controller of claim 7, wherein the network is a Software Defined Network (SDN), and wherein the routing instructions are transmitted according to an OpenFlow protocol.

17. A method for distributing routing instructions to a plurality of nodes within an OpenFlow Software Defined Network (SDN) using a logically centralized multi-controller that comprises a plurality of controllers, wherein the method comprises:
receiving a plurality of incoming data packets;
queuing the incoming data packets, wherein the incoming data packets are queued based on the order received;
processing the incoming data packets based on the order the incoming data packets were queued, wherein the incoming data packets that are first to be queued are the first to be processed;
generating a plurality of flow tables by processing the incoming data packets;
transmitting the flow tables to the plurality of nodes when the flow tables have not been previously generated;
modifying the number of controllers to process the incoming data packets; and
reusing a set of active controllers to continually process the incoming data packets.

18. The method of claim 17, wherein a new controller is assigned to process the incoming data packets when the number of queued incoming data packets exceed a maximum threshold, and wherein one of the controllers used to process the incoming data packet is removed when the number of queued incoming data packets falls below a minimum threshold.

19. The method of claim 17, wherein one of the controllers is designated as a master controller, and wherein the other active controllers are designated as slave controller.

* * * * *